United States Patent [19]

Tsuyama et al.

[11] Patent Number: 4,913,006
[45] Date of Patent: Apr. 3, 1990

[54] AUTOMATIC TRANSMISSION CONTROL SYSTEM FOR A VEHICLE HAVING CONSTANT-SPEED CRUISING CONTROL SYSTEM

[75] Inventors: Toshiaki Tsuyama; Kazutoshi Nobumoto; Kaoru Sotoyama; Toshihiro Matsuoka; Eizi Nishimura, all of Hiroshima, Japan

[73] Assignee: Mazda Motor Corporation, Hiroshima, Japan

[21] Appl. No.: 264,141

[22] Filed: Oct. 28, 1988

[30] Foreign Application Priority Data

Oct. 29, 1987 [JP] Japan .................................. 62-274535

[51] Int. Cl.$^4$ ............................................. B60K 41/06
[52] U.S. Cl. ........................................ 74/866; 74/859; 180/175
[58] Field of Search ................ 74/859, 860, 866, 872; 180/175–179

[56] References Cited

U.S. PATENT DOCUMENTS

| | | | |
|---|---|---|---|
| 4,463,822 | 8/1984 | Tanigawa et al. | 74/859 X |
| 4,535,864 | 8/1985 | Tanigawa et al. | 74/886 X |
| 4,658,929 | 4/1987 | Katou et al. | 180/175 |
| 4,660,672 | 4/1987 | Katou | 180/175 |
| 4,697,478 | 10/1987 | Mastumoto et al. | 74/860 X |
| 4,698,762 | 10/1987 | Moriya et al. | 180/179 X |
| 4,709,595 | 12/1987 | Hayama | 180/177 X |
| 4,736,813 | 4/1988 | Hayama et al. | 180/177 |
| 4,747,326 | 5/1988 | Braun | 74/866 |

Primary Examiner—Dwight G. Diehl
Attorney, Agent, or Firm—Sixbey, Friedman, Leedom and Ferguson

[57] ABSTRACT

An automatic transmission control system for controlling an automatic transmision for use in a vehicle provided with a throttle control system which electrically controls a throttle valve to control the engine output according to the amount of depression of the accelerator pedal and a constant-speed cruising control system which makes the vehicle cruise at a desired constant speed includes a first gear-stage setting system which designates a gear stage of the automatic transmission on the basis of a first gear-shifting pattern, which applies when the constant-speed cruising control is not performed, and in which the gear stages of the automatic transmission are related to the detected amount of depression of the accelerator pedal and the vehicle speed or a value corresponding to the vehicle speed, and a second gear-stage setting system which designates a gear stage of the automatic transmission on the basis of a second gear-shifting pattern, which applies when the constant-speed cruising control is performed in which the gear stages of the automatic transmission are related to the vehicle speed or a value corresponding to the vehicle speed, and a variable independent of the detected amount of depression of the accelerator pedal.

13 Claims, 17 Drawing Sheets

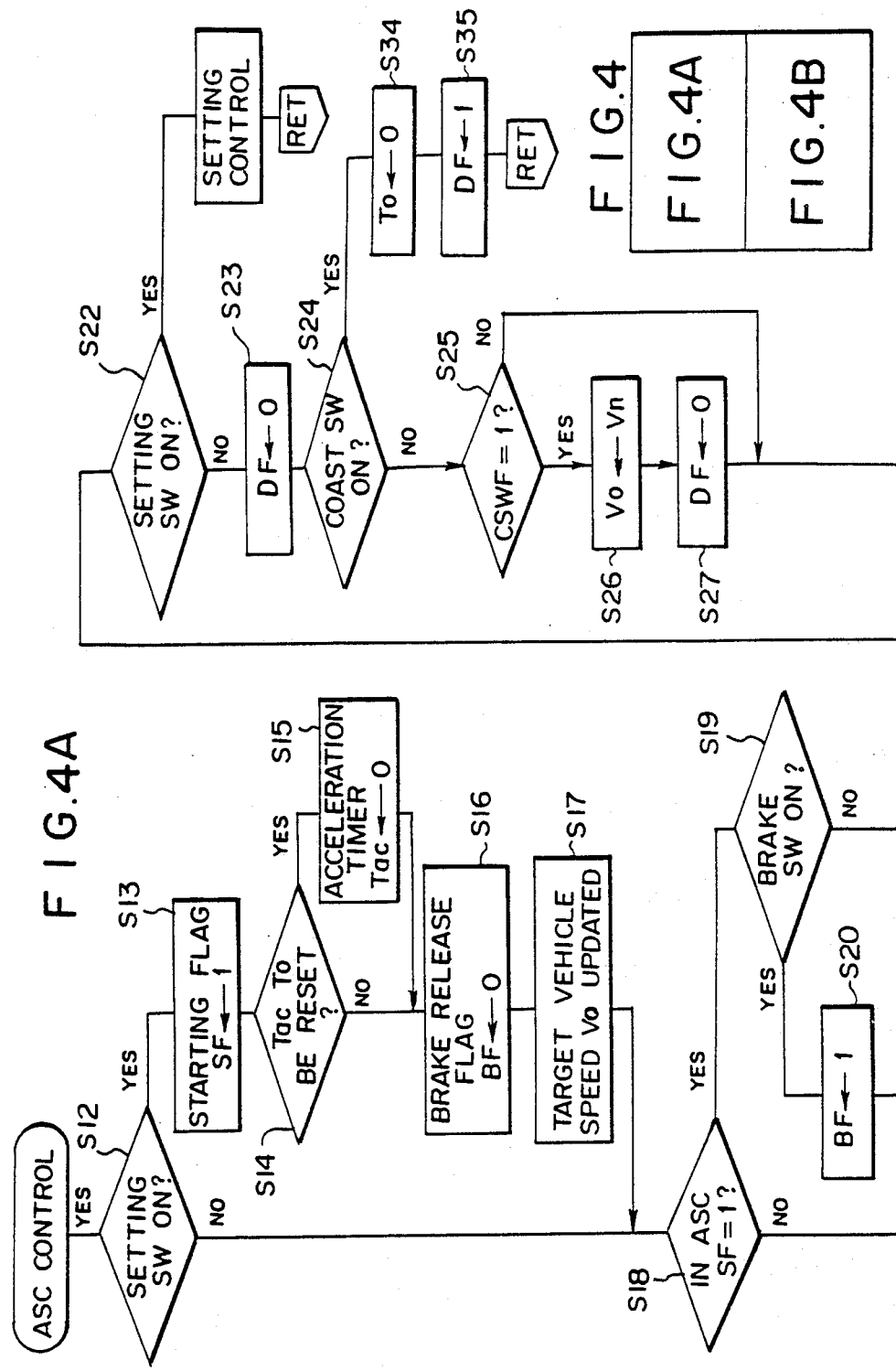

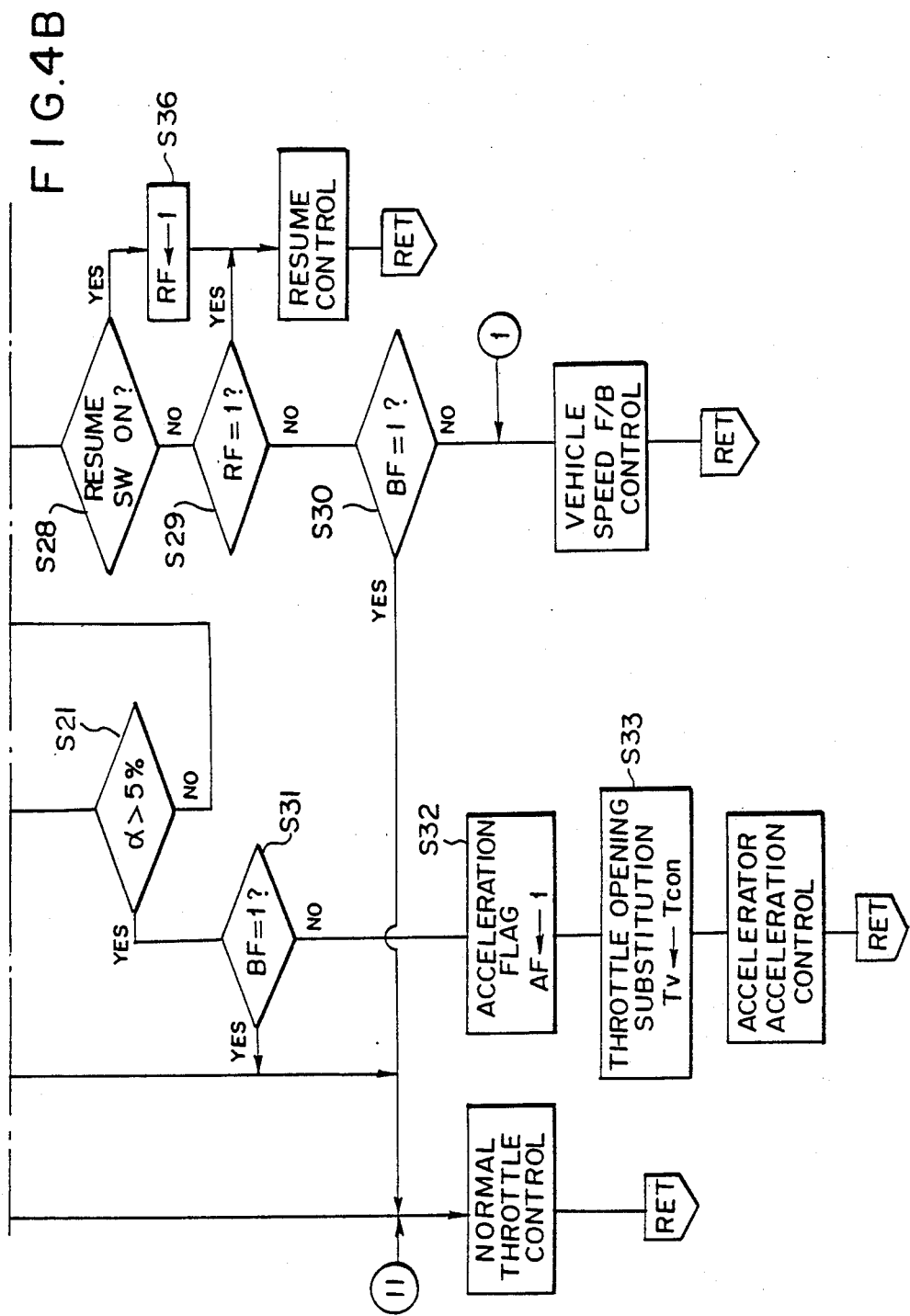

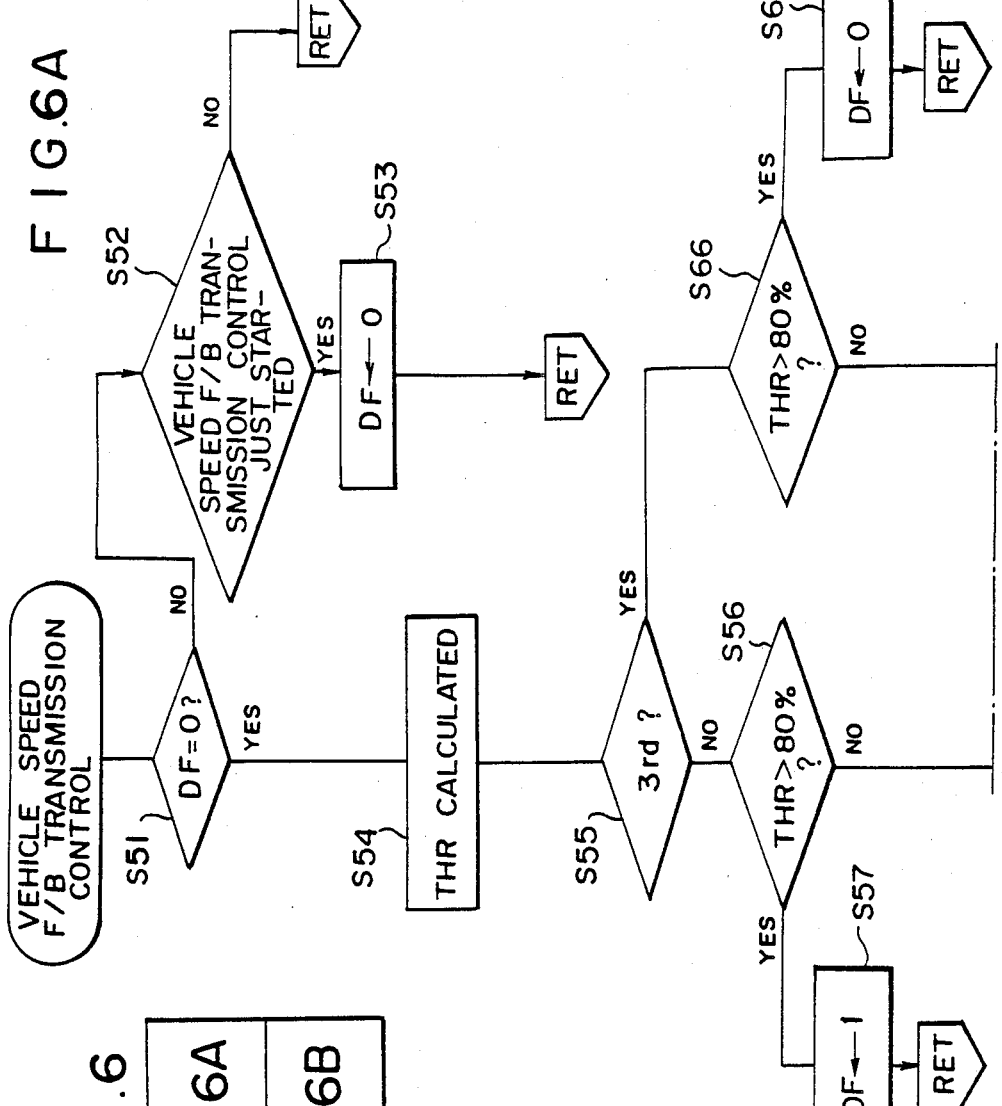

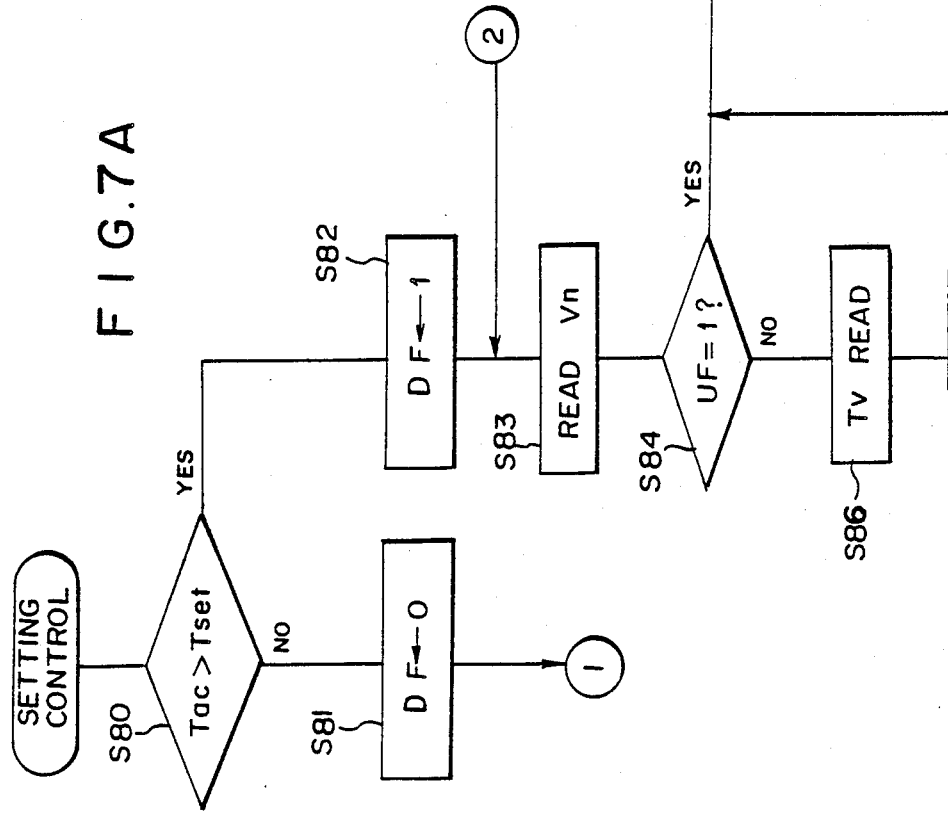

AUTOMATIC TRANSMISSION CONTROL SYSTEM FOR A VEHICLE HAVING CONSTANT-SPEED CRUISING CONTROL SYSTEM

BACKGROUND OF THE INVENTION

1. Field of the Invention

This invention relates to an automatic transmission control system for controlling an automatic transmission for use in a vehicle provided with a throttle control means which electrically controls a throttle valve to control the engine output according to the amount of depression of the accelerator pedal of the vehicle and a constant-speed cruising control system which makes the vehicle cruise at a desired constant speed.

2. Description of the Prior Art

There has been known a vehicle provided with a throttle control means which electrically controls the throttle valve according to the amount of depression of the accelerator pedal, a constant-speed cruising control system which controls the throttle valve independently from the operation of the accelerator pedal to keep the actual vehicle speed constant at a desired constant speed, and an automatic transmission which is controlled with a predetermined gear-shifting pattern according to the amount of depression of the accelerator pedal and the vehicle speed. For example, see Japanese unexamined patent publication No. 57(1982)-196317.

The throttle valve is controlled to open the throttle according to the amount of depression of the accelerator pedal when the constant-speed cruising control is not performed, while when the constant-speed cruising control is performed, the throttle valve is controlled to converge on a target throttle opening obtained on the basis of the difference between the actual vehicle speed and the target vehicle speed (desired vehicle speed), thereby feedback-controlling the engine output to keep the vehicle speed constant at the target vehicle speed without operation of the accelerator pedal.

In the case of an automatic transmission for a vehicle provided with such a throttle control means and a constant-speed cruising control system, gear-shifting is controlled according to the amount of depression of the accelerator pedal and the vehicle speed. However, while the constant-speed cruising control is performed, the accelerator pedal is not operated, and accordingly, the amount of depression does not represent the driver's engine output requirement. Therefore, the gear-shifting cannot be controlled on the basis of the detected amount of depression of the accelerator pedal.

That is, during the time when the constant-speed cruising control is performed, the acceleration pedal is operatively separated from the throttle valve, and even if the throttle valve is open, there is no depression of the accelerator pedal.

On the other hand, when the throttle valve is controlled in response to operation of the accelerator pedal, the change in the throttle opening does not strictly follow the change in the amount of depression of the accelerator pedal. Instead the change in the amount of depression of the accelerator pedal is transmitted to the throttle after various corrections such as delaying. Accordingly, when the engine output is controlled in response to the operation of the accelerator pedal by the driver, it is preferable that gear-shifting be controlled according to the amount of depression of the accelerator pedal in order to meet driver's requirements, e.g., a quick response to kickdown.

SUMMARY OF THE INVENTION

In view of the foregoing observations and description, the primary object of the present invention is to provide an automatic transmission control system which can control the gear-shifting of the automatic transmission in a manner suitable for the constant-speed cruising control when it is performed and at the same time can control the same to follow driver's requirements in an optimal manner when the constant-speed cruising control is not performed.

In accordance with the present invention, the automatic transmission control system comprises a first gear-stage setting means which designates a gear stage of the automatic transmission on the basis of a first gear-shifting pattern, which applies when the constant-speed cruising control is not performed, and in which the gear stages of the automatic transmission are related to the detected amount of depression of the accelerator pedal and the vehicle speed or a value corresponding to the vehicle speed, and a second gear-stage setting means which designates a gear stage of the automatic transmission on the basis of a second gear-shifting pattern, which applies when the constant-speed cruising control is performed in which the gear stages of the automatic transmission are related to the vehicle speed or a value corresponding to the vehicle speed, and a variable independent of the detected amount of depression of the accelerator pedal.

FIG. 1 is a schematic view showing a vehicle provided with an automatic transmission control system in accordance with the present invention together with a constant-speed cruising control system and a throttle control means. The throttle control means B controls the opening of the throttle valve A of the engine E. A signal from an accelerator depression amount detecting means D for detecting the amount of depression of the accelerator pedal C is input into the throttle control means B. The throttle control means B controls the throttle valve A to obtain a target opening corresponding to the amount of depression of the accelerator pedal C, thereby controlling the engine output and the vehicle speed.

Further, a signal from the constant-speed cruising control system F for keeping the vehicle speed constant at a desired speed is input into the throttle control means B, and signals from a vehicle speed detecting means G for detecting the actual vehicle speed and a target vehicle speed setting means H for setting a target vehicle speed are input into the constant-speed cruising control system F. The constant-speed cruising control system F outputs a control signal representing a target throttle opening determined on the basis of the difference between the actual vehicle speed and the target vehicle speed, and causes the vehicle speed to remain constant at the target speed.

The transmission control system K shifts the gear stages of the automatic transmission J into a stage designated by a first gear-stage setting means L or a second gear-stage setting means M according to the condition under which the vehicle is operating. The first gear-stage setting means L designates a gear stage of the automatic transmission on the basis of a first gear-shifting pattern in which the gear stages of the automatic transmission are related to the detected amount of depression of the accelerator pedal and the vehicle speed or a value corresponding to the vehicle speed. The first gear-shifting pattern applies when the constant-speed cruising control is not performed. The second gear-stage setting means M designates a gear stage of the automatic transmission on the basis of a second gear-shifting pattern in which the gear stages of the automatic transmission are related to the vehicle speed or a value corresponding to the vehicle speed and a variable independent of the detected amount of depression of the accelerator pedal. The second gear-shifting pattern when the constant-speed cruising control is performed.

The second gear-stage setting means M may use, for instance, a detected throttle opening as the variable independent of the detected amount of depression of the accelerator pedal, and may determine a gear stage on the basis of a gear-shifting pattern in which the gear stages are related to the throttle opening and the vehicle speed. The second gear-stage setting means may also convert the throttle opening into the amount of depression of the accelerator pedal. A gear stage may then be determined from this conversion in conjunction with the vehicle speed.

BRIEF DESCRIPTION OF THE DRAWINGS

FIGS. 4, 4A and 4B are flow charts showing a subroutine of the throttle controller, FIGS. 6, 6A, 6B, 7, 7A, 7B and 8 are flow charts respectively showing subroutines of the throttle controller.

DESCRIPTION OF THE PREFERRED EMBODIMENTS

Figure 1:
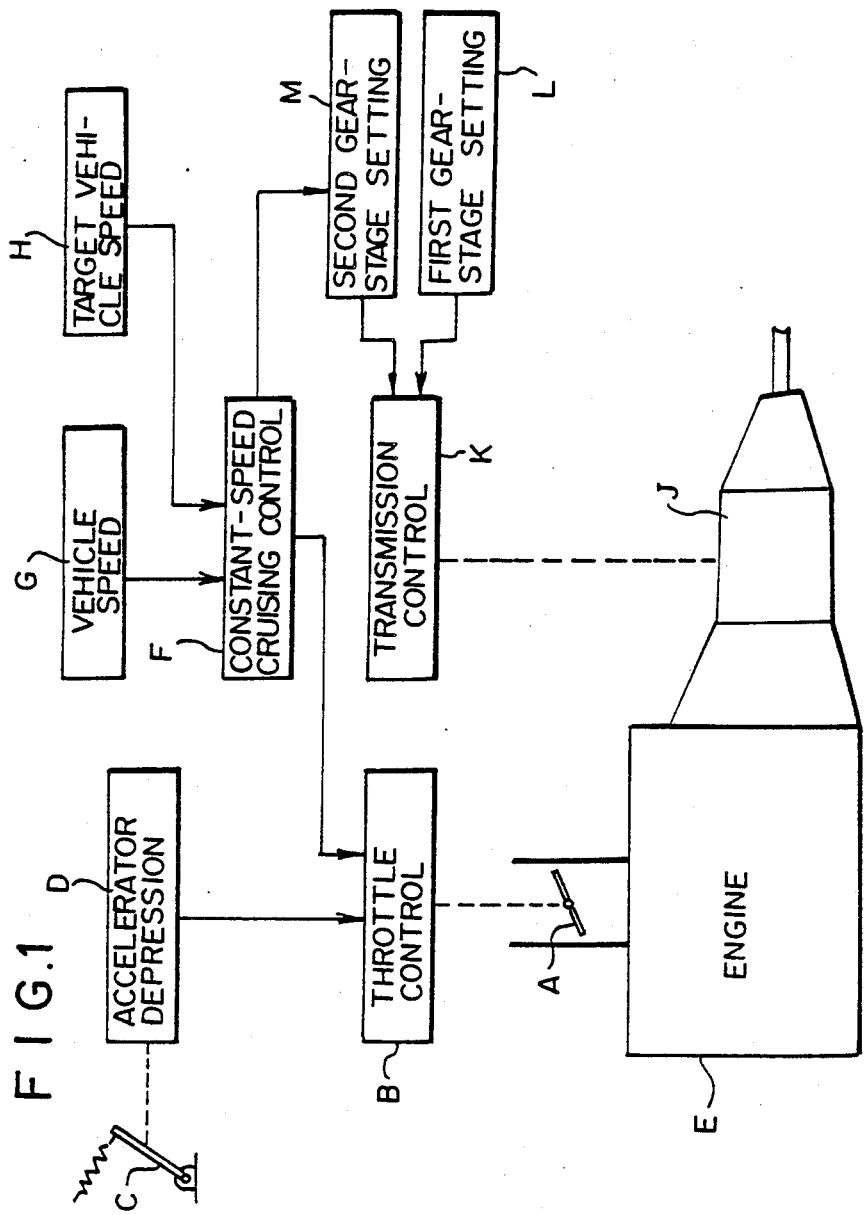
FIG. 1 is a schematic view showing a vehicle provided with an automatic transmission control system in accordance the present invention together with a constant-speed cruising control system and a throttle control means.
Figure 2:
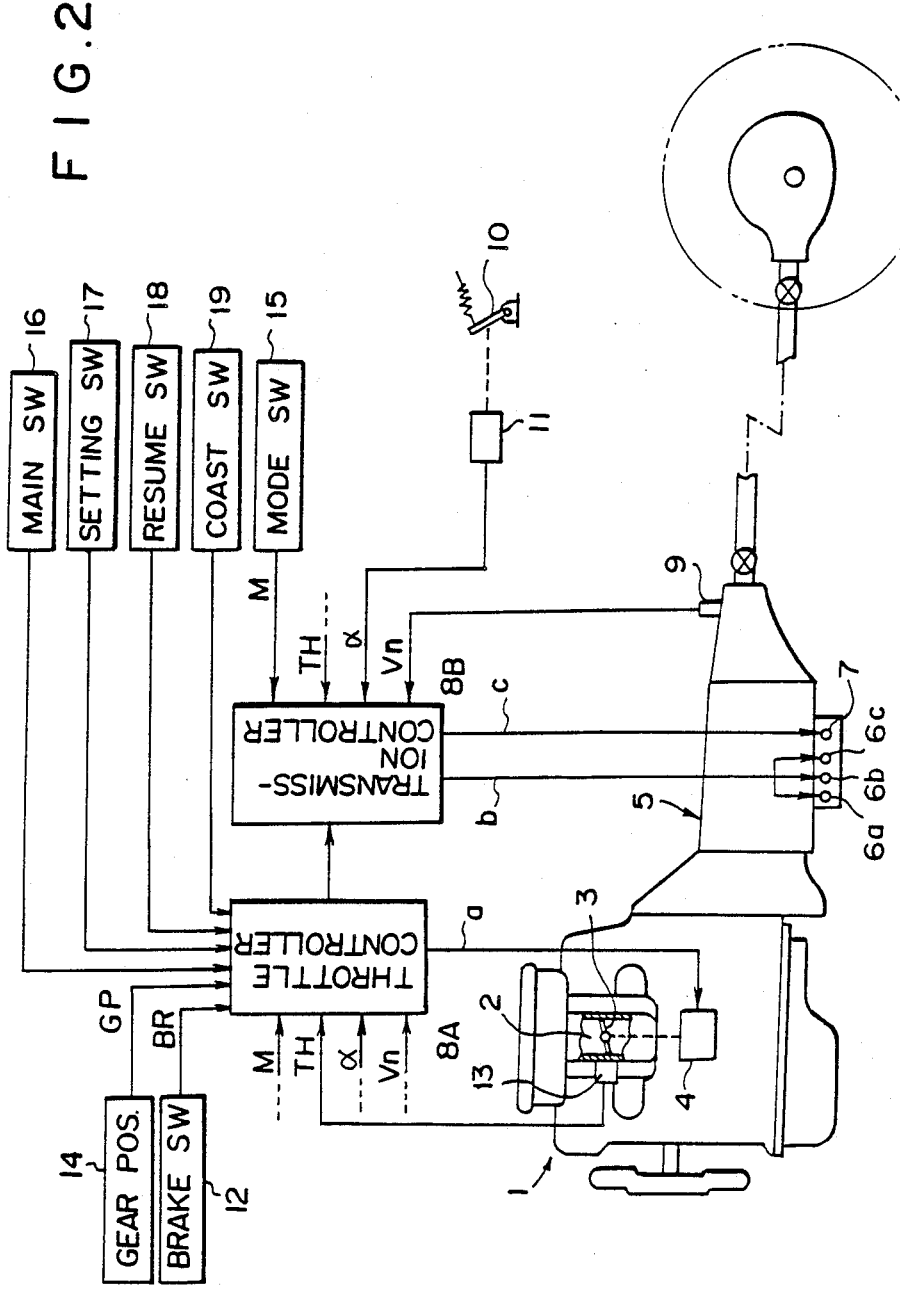
FIG. 2 is a schematic view showing a control system of a vehicle provided with a constant speed cruising system, a throttle control means and a transmission control system in accordance with an embodiment of the present invention.

In FIG. 2, an engine 1 has an intake passage 2 provided with a throttle valve 3 for controlling the amount of intake air. The throttle valve 3 is opened and closed by a throttle actuator 4 which may comprise a DC motor, for example. An automatic transmission 5 has gear-shifting solenoids $6a$ to $6c$ and a lockup solenoid 7, and by selectively energizing the gear-shifting solenoids $6a$ to $6c$, the hydraulic control circuit of the automatic transmission 5 is controlled to selectively apply and release the hydraulic fastening elements of the automatic transmission 5, and the transmission gear mechanism thereby shifts the gear stages. By energizing the lockup solenoid 7, the lockup clutch (not shown) in the torque converter of the automatic transmission 5 is applied and by de-energizing the same, the lockup clutch is released.

A throttle controller 8A outputs a throttle control signal a to the throttle actuator 4, and a transmission controller 8B outputs a gear-shifting control signal b and a lockup control signal c, respectively, to the gear-shifting solenoids $6a$ to $6c$, and the lockup solenoids 7. To the throttle controller 8A are input a vehicle speed signal Vn from a vehicle speed sensor 9, an accelerator pedal depression signal $\alpha$ from an accelerator position sensor 11, which detects the amount of depression of an accelerator pedal 10, a brake signal BR from a brake switch 12, which detects application of a brake (not shown), a throttle opening signal TH from a throttle position sensor 13 which detects the opening of the throttle valve 3, a gear position signal GP from a gear position sensor 14, which detects which driving range the selector lever of the automatic transmission 5 is in, and a gear-shifting mode signal M from a mode switch 15. Further control signals (an on-off signal) are input into the throttle controller 8A from a main switch 16, a setting switch 17, a resume switch 18, and a coast switch 19, which act as control switches for operating the constant-speed cruising control system.

To the transmission controller 8B are input the vehicle speed signal Vn from the vehicle speed sensor 9, the accelerator pedal depression signal $\alpha$ from the accelerator position sensor 11, the throttle opening signal TH from the throttle position sensor 13 and the gear-shifting mode signal M from the mode switch 15.

Figure 3:
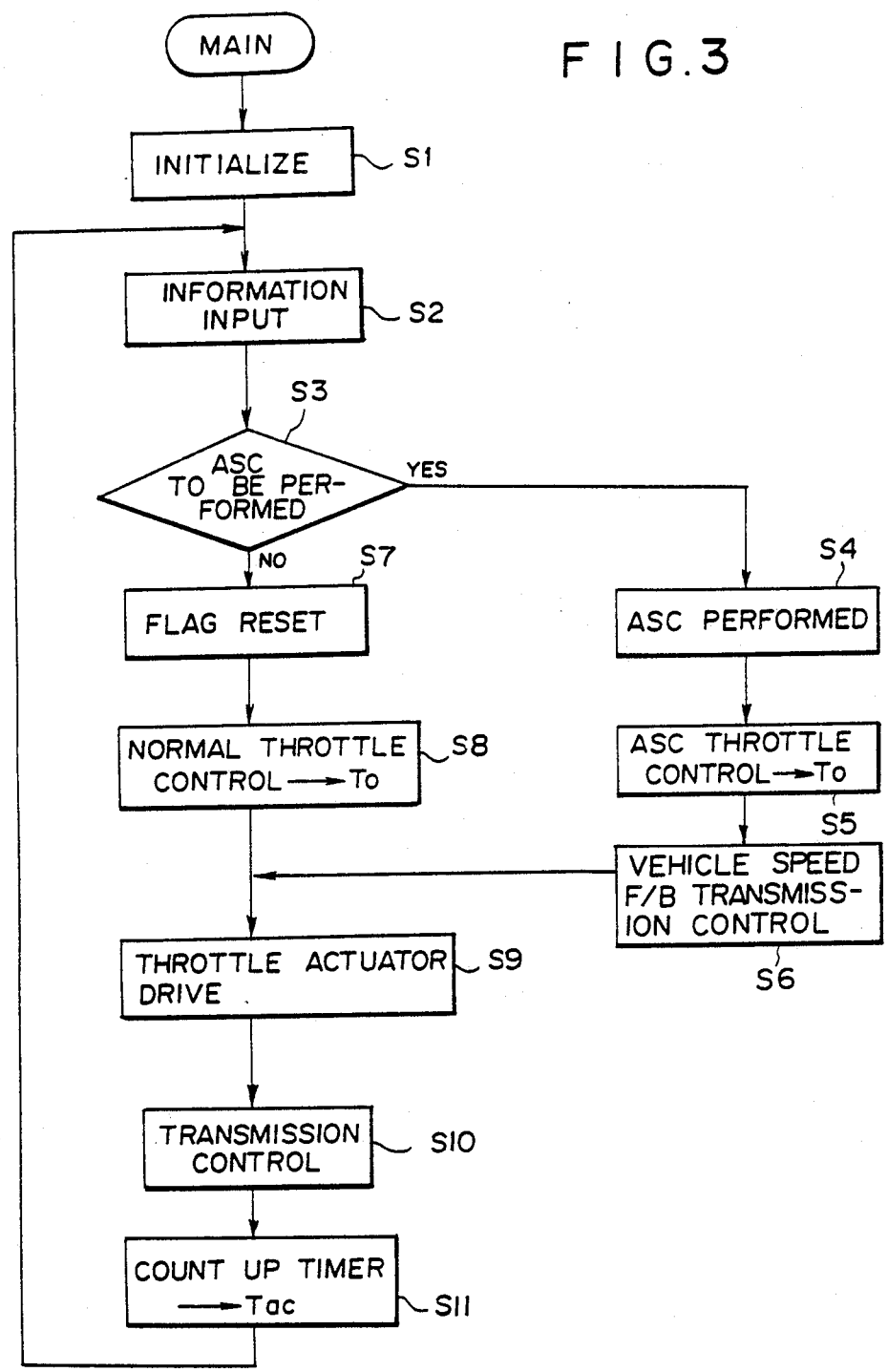
FIG. 3 is a flow chart showing a main routine of the throttle controller.

FIG. 3 shows a main routine of the throttle controller 8A. The throttle controller 8A is first initialized in step S1. Then in step S2, detecting signals from the aforesaid sensors are read and various information required for control is obtained. In step S3, whether the requirements for starting automatic speed control (ASC) including constant-speed cruising control, have been satisfied is determined. That is, the throttle controller 8A determines that the ASC may be started when the main switch 16 has been closed, the selector lever is in D-range, and the vehicle speed is higher than a preset value (e.g., 40Km/h). If at anytime one of these requirements is not to be satisfied, or the brake is operated, the ASC is interrupted.

When the ASC requirements are satisfied, the throttle controller 8A performs mode setting control, that is, the controller 8A selects a vehicle speed feedback control mode, an accelerating mode or the like, according to how the setting switching 17, the resume switch 18, the coast switch 19, the accelerator pedal 10 and the brake are operated (step S4). Then the controller 8A sets a target throttle opening To on the basis of the mode selected, and performs vehicle speed feedback transmission control. (steps S5 and S6) On the other hand, when the ASC requirements have not been satisfied, the controller 8A proceeds to step S7, where various flags for the ASC are reset. Then the controller 8A sets a target throttle opening To according to the amount of depression of the accelerator pedal 10 in step S7. (normal throttle control)

The controller 8A outputs a throttle control signal a, corresponding to the target throttle opening To set in the step S5 or S8, to the throttle actuator 4, thereby moving the throttle valve 3 to a position corresponding to the target throttle opening To (step S9). Then in step S10, the controller 8A determines the limits at which the gear stage are shifted during the ASC including the constant-speed cruising control, taking into account the mode selected in the step S4, and outputs to the transmission controller 8B, for instance, a fourth-gear inhibiting signal. Then in step S11, the controller 8A causes an acceleration timer Tac to count up in order to cause a delay (to be described later). The routine shown in FIG. 3 is performed every predetermined time (e.g., 30 msec).

FIG. 4 shows a mode setting control subroutine carried out in step S4 of the main routine shown in FIG. 3. In this subroutine, the controller 8A determines whether the setting switch 17 has been closed in step S12. When the answer is YES, i.e., when it is judged that the setting switch 17 has been closed, a starting flag SF is set to 1 in step S13, and whether the conditions require reset of the acceleration timer Tac, i.e., whether a target vehicle speed Vo has been set, is judged in step S14. When the target vehicle speed Vo is to be set by the latest operation of the setting switch 17, for instance, which is the case when the ASC has been interrupted by application of the brake immediately after operation of the main switch 16, the acceleration timer Tac is reset to 0 in step S15. Since the brake release condition has been interrupted, a brake release flag BF is reset in step S15, and the target vehicle speed Vo is updated on the basis of the actual vehicle Vn in step S16. The latest target vehicle speed at the time the setting switch 17 is opened is adopted as the target vehicle speed Vo.

Figure 9:
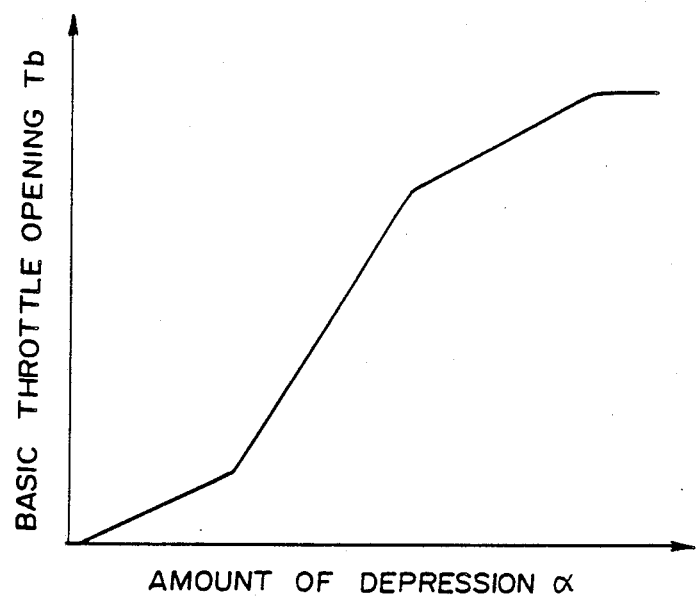
FIG. 9 is a graph of a relation between the basic throttle opening and the amount of depression of the accelerator pedal, FIG. 10 graphs relations between the vehicle speed and the throttle opening required for accelerating the vehicle at two predetermined constant accelerations during cruising on an even road.

When the target vehicle speed Vo is set in the aforesaid manner, whether the ASC is functioning is determined by examining the starting flag SF in step S18. When SF is in the 1 position, the controller 8A determines whether the brake pedal has been operated (step S19), and when the answer is YES, the controller 8A shifts to the normal throttle control mode after setting the brake release flag BF to 1 (step S20). In the normal throttle control mode, the amount of depression α of the accelerator pedal 10 is detected, and a basic throttle opening Tb for the detected amount of depression α is calculated taking into account the vehicle speed and the selected gear-shifting mode (i.e., economy, normal or power). Then the target throttle opening To is set by correcting the basic throttle opening Tb according to the speed of depressing the accelerator pedal, the vehicle speed, the engine coolant temperature, and the like. When the answer of the step S19 is NO, the controller determines whether the accelerator pedal 10 has been depressed (step S21), and when the answer is NO, the controller 8A proceeds to step S22 where it determines whether the setting switch 17 has been closed. When it is judged in step S21 that the accelerator pedal has been depressed and at the same time it is judged that the brake release flag BF is in the 1 position in step S31, the controller 8A shifts to the normal throttle control mode. When it is judged in step S31 that the brake release flag BF is not in the 1 position, the controller 8A sets an acceleration flag AF to 1, and shifts to an accelerator acceleration control mode after substituting a throttle-opening-during-cruising Tcon (to be described later) for a target throttle opening Tv (will become apparent later) in order to prepare for restarting the ASC. In the accelerator acceleration control, the target throttle opening To is set on the basis of the sum of the target throttle opening Tv corresponding to the target vehicle speed Vo in the vehicle speed feedback control which was performed by the controller 8A immediately before the controller 8A started the accelerator acceleration control, and the basic throttle opening Tb, corresponding to the amount of depression α of the accelerator pedal 10 at that time. FIG. 9 shows an example of the relation between the basic throttle opening Tb and the amount of depression of the accelerator pedal 10.

When it is judged in the step S22 that the setting switch 17 has been closed, the controller 8A performs setting control which will be described later with reference to FIG. 7. When it is judged in the step S22 that the setting switch 17 is open, the controller 8A sets the fourth-gear inhibiting flag DF to 0 in step S23. (When the fourth-gear inhibiting flag DF is in the 1 position, a fourth-gear inhibiting signal is output.) Thereafter, it is judged in step S24 whether the coast switch 19 has been closed. When the answer is YES, the target throttle opening To is set to 0 in step S34, and the throttle valve 2 is held in the fully closed position so long as the coast switch 19 is closed. Then the fourth-gear inhibiting flag DF is set to 1 in step S35. On the other hand, when it is judged in step S24 that the coast switch 19 is open, the controller 8A judges in step S25 whether the coast switch flag CSWF is in the 1 position. When the answer is NO, the controller 8A directly proceeds to step S28, while when the answer is YES, the controller 8A proceeds to step S28 by way of steps S26 and S27. In step S26, the actual vehicle speed Vn is adopted as the target vehicle speed Vo, and in the step S27, the fourth-gear inhibiting flag DF is reset to 0. In step S28, the controller 8A judges whether the resume switch 18 has been closed, and when the answer is YES, the controller 8A shifts to a resume control mode after setting the resume flag RF to 1 in step S36. On the other hand, when it is judged in step S28 that the resume switch 18 is open, the controller 8A shifts to a vehicle speed feedback control (constant-speed cruising control) mode provided that neither the resume flag nor the brake release flag BF is in the 1 position (steps S28 and S29).

In the gear stage limitation control function indicated in step S10 of the main routine, the torque margin is judged on the basis of the target vehicle speed and the actual vehicle speed (Vo-Vn) and the throttle opening TH, and whether to downshift (or inhibit shifting into fourth gear) or upshift (permission to shift into fourth gear) is determined according to the torque margin when the controller 8A is operating in the vehicle speed feedback control mode. For example, when the throttle opening is larger than 80%, it is judged than the torque margin is insufficient, and the transmission is held in third gear (shifting into fourth gear is inhibited) even if the actual vehicle speed has converged on the target vehicle speed. Further, when the vehicle speed has not converged on the target vehicle speed, it is judged that the torque margin is insufficient even if the throttle opening is smaller than 80% (but larger than 60%), and the transmission is inhibited from being shifted into fourth gear. When the controller 8A operates in the accelerating mode, the fourth-gear inhibiting command is output in order to shift the transmission down to third gear. When the controller 8A operates in the coast mode, the fourth-gear inhibiting command is also output to shift the transmission down to third gear provided that the difference between the target vehicle speed and the actual vehicle speed is large.

Figure 5:
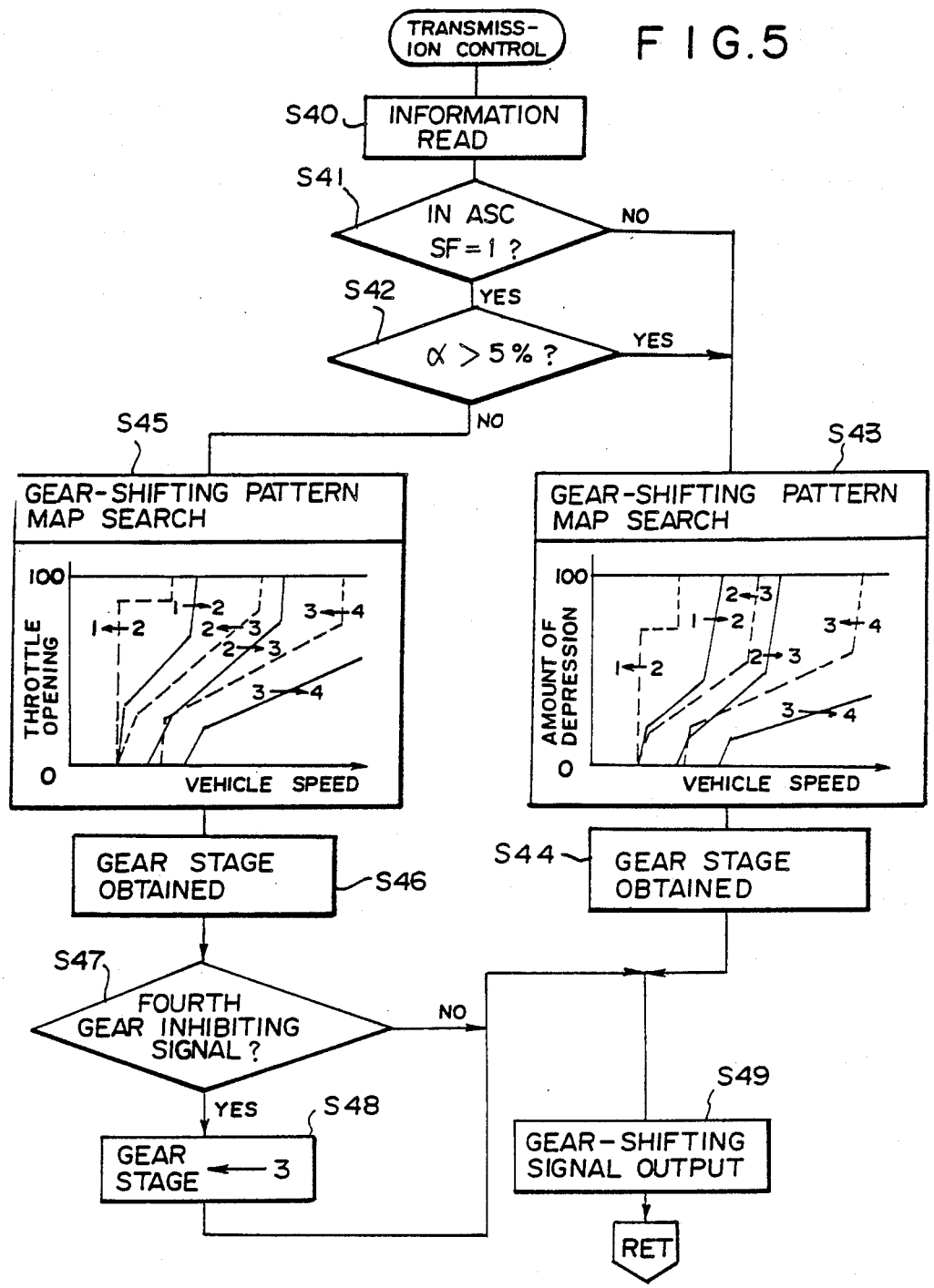
FIG. 5 is a flow chart showing a part of a main routine of the transmission controller.

FIG. 5 shows a part of the main routine of the transmission controller 8B, which part relates to the gear-shifting patterns of the automatic transmission 5. The transmission controller 8B first reads the actual vehicle speed Vn, the amount of depression α of the accelerator pedal, the throttle opening TH and the like in step S40. Then in step S41, the controller 8B determines whether the ASC is now being performed. If the answer is NO, that is, if the control mode is the normal throttle control mode, then the controller 8B obtains, on the basis of the detected amount of depression α of the accelerator pedal and the actual vehicle speed Vn, a gear stage from a normal throttle control mode gear-shifting pattern map. In the normal throttle control mode map the gear stages of the transmission are related to the vehicle speed Vn and the amount of depression o of accelerator pedal. After obtaining a gear stage, the transmission controller outputs a gear-shifting signal which determines the gear stage in which the transmission operates (steps S43, S44 and S49).

On the other hand, when it is determined in step S41 that the ASC is now operating and at the same time it is determined in step S42 that the accelerator pedal 10 has not been depressed, the controller 8B obtains, on the basis of the detected throttle opening TH and the actual vehicle speed Vn, a gear stage from an ASC mode gear-shifting pattern map in which the gear stages of the transmission are related to the vehicle speed Vn and the throttle opening (steps S45 and S46). Then, when it is determined in step S47 that the fourth-gear inhibiting signal has not been input into the transmission controller 8B from the throttle controller 8A, the transmission controller 8B outputs a gear-shifting signal which commands the transmission to enter the gear-stage obtained from the map (step S49). If it is determined in the step S47 that the fourth-gear inhibiting signal has been input into the transmission controller 8B, the controller 8B sets the gear stage to third gear irrespective of the gear stage obtained from the map and outputs a gear-shifting signal which causes that the transmission to enter third gear (steps S48 and S49).

Figure 6B:
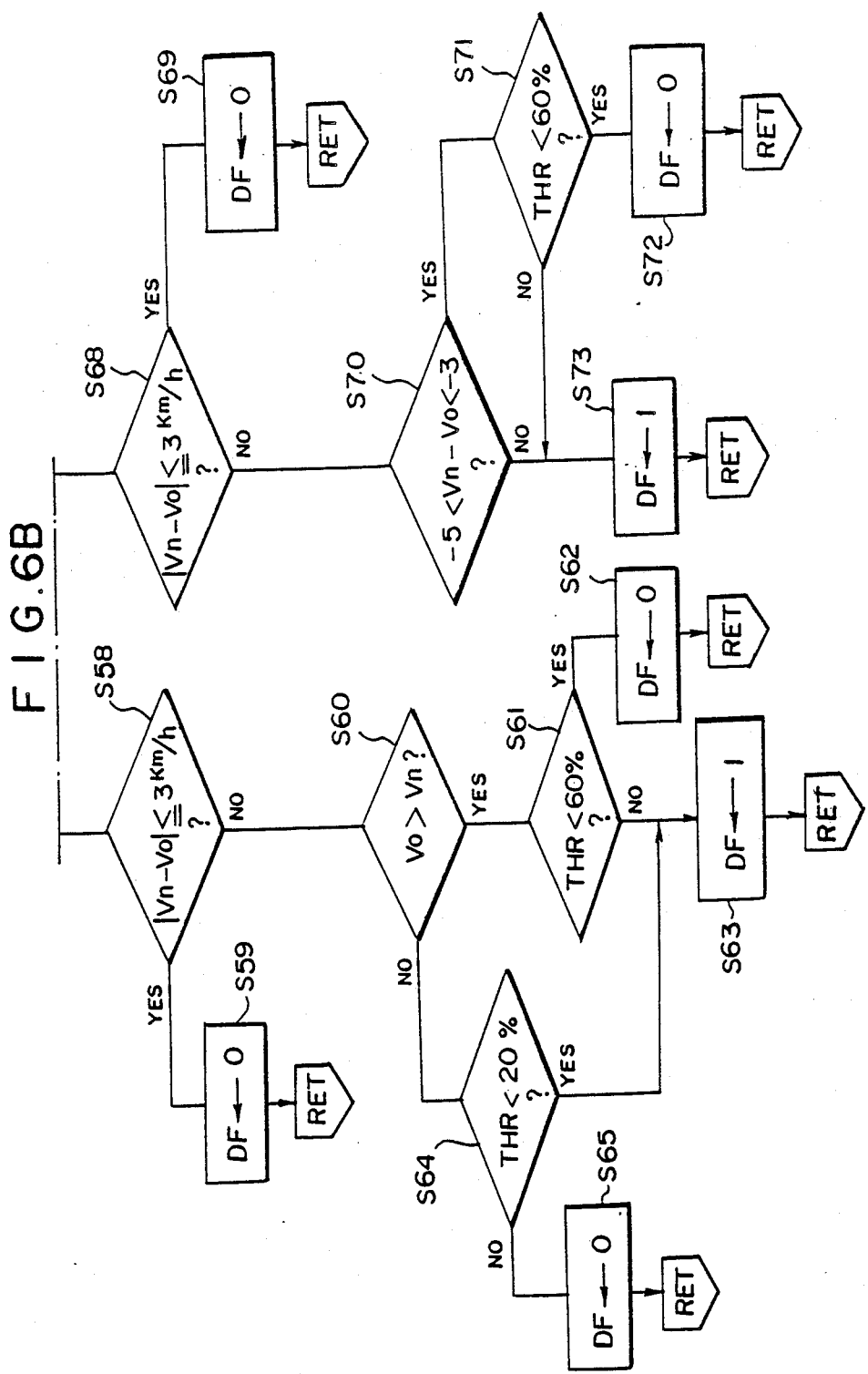

FIG. 6 shows a vehicle speed feedback transmission control subroutine. First the throttle controller 8A determines in step S51 whether the fourth-gear inhibiting flag DF has been reset to 0. The fourth-gear inhibiting flag DF is set in step S35 shown in FIG. 4. When the flag DF has not been reset, the controller 8A proceeds to step S52 and determines whether the vehicle speed feedback transmission control has just been started. When the answer is YES, the fourth-gear inhibiting flag DF is reset to 0 in step S53.

When it is judged in step S51 that the fourth-gear inhibiting flag DF has been reset, an average throttle opening THR is calculated in step S54. The average throttle opening THR is the average of a predetermined number of preceding detected throttle openings THn. In the vehicle speed feedback transmission control subroutine, the average throttle opening THR is used in order to prevent hunting of the transmission when the throttle opening per se is hunting. Thereafter, the controller 8A determines in step S55 whether the transmission is in third gear on the basis of the gear position signal GP. When the answer is NO, the controller 8A proceeds to step S56 and determines whether there is a sufficient torque margin by judging whether the throttle opening THR has exceeded 80%. When the throttle opening THR has exceeded 80% and the torque margin is insufficient, the controller 8A sets the fourth-gear inhibiting flag DF to 1 in step S57. Otherwise, the controller 8A determines in step S58 whether the difference between the target vehicle speed Vo and the actual vehicle speed Vn is within plus or minus 3Km/h, that is, whether the actual vehicle speed Vn is converging on the target vehicle speed Vo. When it is judged that the actual vehicle speed Vn is converging on the target vehicle speed Vo, the controller 8A resets the fourth-gear inhibiting flag DF to 0 in step S59. Otherwise, the controller 8A determines in step S60 whether the actual vehicle speed Vn is lower than the target vehicle speed Vo. When the former is lower than the latter, which is the case, for instance, when the vehicle is ascending a slope, the controller 8A determines in step S61 whether there is a sufficient torque margin by judging whether the throttle opening THR is less than 60%. When the throttle opening is less than 60%, that is, when there is a sufficient torque margin, the controller 8A resets the fourth-gear inhibiting flag DF to 0 in step S62. On the other hand, when the throttle opening is more than 60%, the controller 8A considers that the torque margin is not sufficient to accelerate the vehicle and resets the fourth-gear inhibiting flag DF to 0 in step S63.

On the other hand, when it is judged in step S60 that the actual vehicle speed Vn is not lower than the target vehicle speed Vo, which is the case, for instance, when the vehicle is descending a slope, the controller 8A proceeds to step S64 and determines whether the throttle opening THR is less than 20%, thereby judging whether the engine brake effect is sufficient. When it is judged that the throttle opening THR is more than 20% and the engine brake effect can be further enhanced to a sufficient extent, the controller 8A resets the fourth-gear inhibiting flag DF to 0 considering that the transmission need not be shifted down to decelerate the vehicle in step S65. On the other hand, when the throttle opening THR is less than 20% and it is considered that the engine brake effect is not sufficient to decelerate the vehicle, the controller 8A sets the fourth-gear inhibiting flag DF to 1 in step S63.

When it is judged in step S55 that the transmission is in third gear, the controller 8A proceeds to step S66 and determines whether there is a sufficient torque margin by judging whether the throttle opening THR has exceeded 80%. When the throttle opening THR has exceeded 80% and the torque margin is insufficient, the controller 8A resets the fourth-gear inhibiting flag DF to 0 in step S67. Otherwise, the controller 8A determines in step S68 whether the difference between the target vehicle speed Vo and the actual vehicle speed Vn is within plus or minus 3Km/h, that is, whether the actual vehicle speed Vn is converging on the target vehicle speed Vo. When it is judged that the actual vehicle speed Vn is converging on the target vehicle speed Vo, the controller 8A resets the fourth-gear inhibiting flag DF to 0 in step S69. Otherwise, the controller 8A determines in step S70 whether the actual vehicle speed Vn is 3 to 5Km/h lower than the target vehicle speed Vo. When the former is lower than the latter and the difference therebetween is 3 to 5Km/h, which is the case, for instance, when the vehicle is ascending a slope, the controller 8A determines in step S71 whether there is a sufficient torque margin by judging whether the throttle opening THR is less than 60%. When the throttle opening is less than 60%, that is, when there is a sufficient torque margin, the controller 8A resets the fourth-gear inhibiting flag DF to 0, considering that fourth gear will suffice for accelerating the vehicle (step S72). On the other hand, when the throttle opening is more than 60%, the controller 8A considers that the torque margin is not sufficient to accelerate the vehicle and sets the fourth-gear inhibiting flag DF to 1 (step S73).

The particular values of the throttle opening for judging the torque margin or the like, i.e., 80%, 60%, 20%, may be suitably determined depending on the output characteristics of the engine or the like.

Figure 7B:
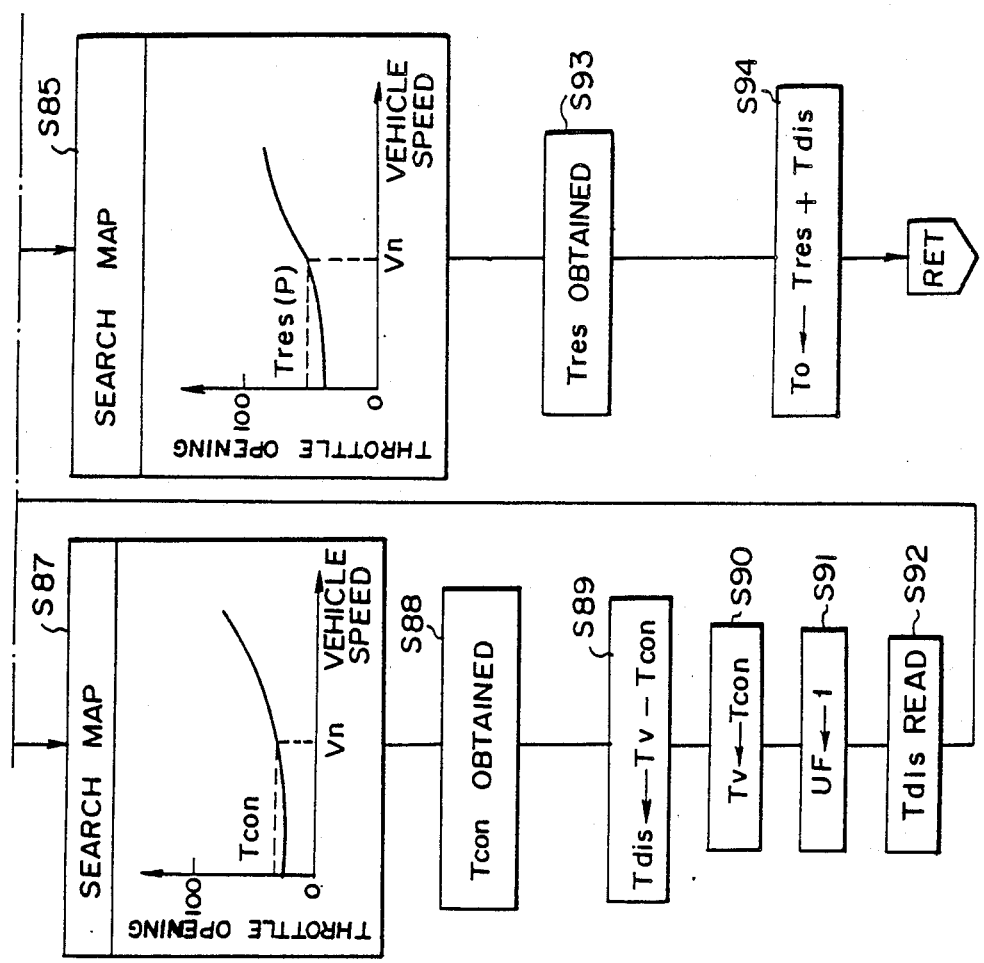

FIG. 7 shows a setting control subroutine carried out in the subroutine shown in FIG. 4. When the setting switch 17 is operated during the vehicle speed feedback control process, the controller 8A determines in step S80 whether the count in the acceleration timer Tac has exceeded a preset value Tset (delay time). When the answer is NO, the controller 8A shifts to the vehicle speed feedback control mode after resetting the fourth-gear inhibiting flag DF in step S81. When it is judged that the count in the acceleration timer Tac has exceeded the preset value Tset, the controller 8A sets the fourth-gear inhibiting flag DF to 1 in step S82, and reads the actual vehicle speed Vn in step S83. Then the controller 8A determines in step S84 whether a correction flag UF is in the 1 position, and when the answer is YES, the controller 8A directly proceeds to step S85 while when the answer is NO, the controller 8A proceeds to step S85 by way of steps S86 to S92. In step S86, the controller 8A reads the present target throttle opening Tv. Then the controller 8A obtains, on the basis of the actual vehicle speed Vn, a throttle opening Tcon for even road cruising from a map in which the throttle opening Tcon is related to the actual vehicle speed Vn (steps S87 and S88). Then a load compensating throttle opening Tdis is obtained in step S89 on the basis of the difference between the present target throttle opening Tv and the even road cruising throttle opening Tcon for the actual vehicle speed Vn. In the next step, S90, the controller 8A substitutes the even road cruising throttle opening Tcon for the present target throttle opening Tv. Further, the controller 8A sets the correction flag UF to 1 in step S91, and reads the load compensating throttle opening Tdis in step 92. Then the controller 8A proceeds to step S85.

Then the controller 8A obtains, on the basis of the actual vehicle speed Vn, a throttle opening Tres for accelerating the vehicle speed at a constant acceleration on an even road from a constant acceleration map in which the throttle opening Tres is related to the actual vehicle speed Vn (steps S85 and S93). Then the controller 8A sets the target throttle opening To to the sum of the Tres and the Tdis in step S94.

Figure 10:
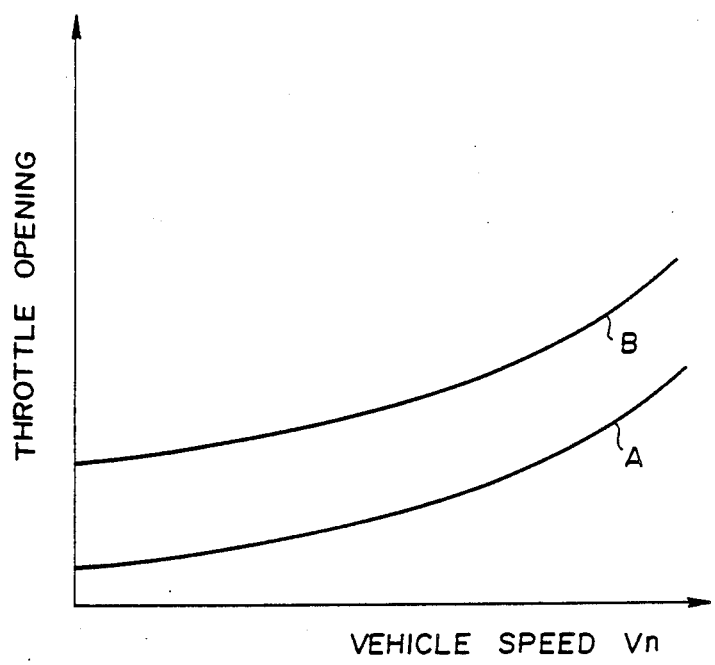

In FIG. 10, curve A shows an example of the relation between the vehicle speed and the throttle opening required for the vehicle to cruise at a given constant speed on an even road, and curve B shows an example of the relation between the vehicle speed and the throttle opening required for accelerating the vehicle at a predetermined constant acceleration during cruising on an even road.

Figure 8:
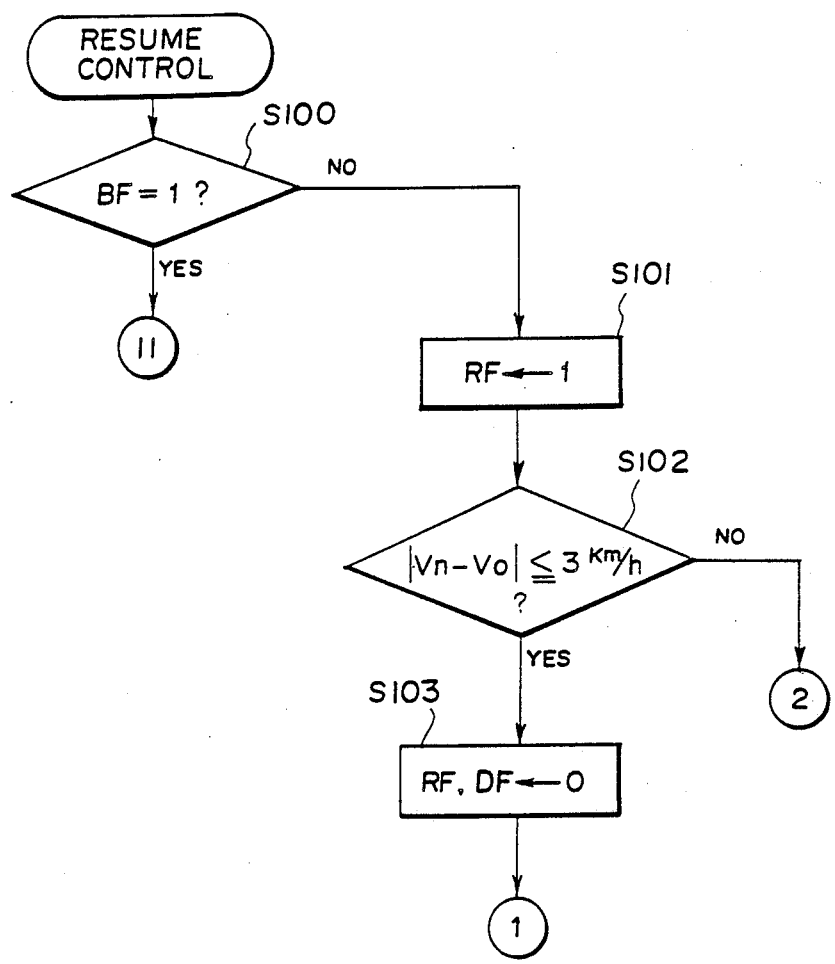

FIG. 8 shows a resume control subroutine carried out as indicated in FIG. 4. When the resume switch 18 is closed to return the target vehicle speed Vo to the original value set when the ASC was interrupted by operation of the brake during the vehicle speed feedback control process, the controller 8A carried out the resume control subroutine. The controller 8 first determines whether the brake release flag BF is in the 1 position (step S100), and when the answer is YES, the controller 8A shifts to the normal throttle control mode (FIG. 4). On the other hand, when the answer is NO, the controller 8A sets the resume flag RF to 1 in step S101, and determines in step S102 whether the difference between the target vehicle speed Vo and the actual vehicle speed Vn is within plus or minus 3Km/h, that is, whether the actual vehicle speed Vn is converging on the target vehicle speed Vo. When it is judged that the actual vehicle speed Vn is converging on the target vehicle, the controller 8A resets the resume flag RF and the fourth-gear inhibiting flag DF to 0 in step S103 and shifts to the vehicle speed feedback control mode. Otherwise, the controller 8A proceeds to step S83 in the setting control routine shown in FIG. 7.

Figure 11A:
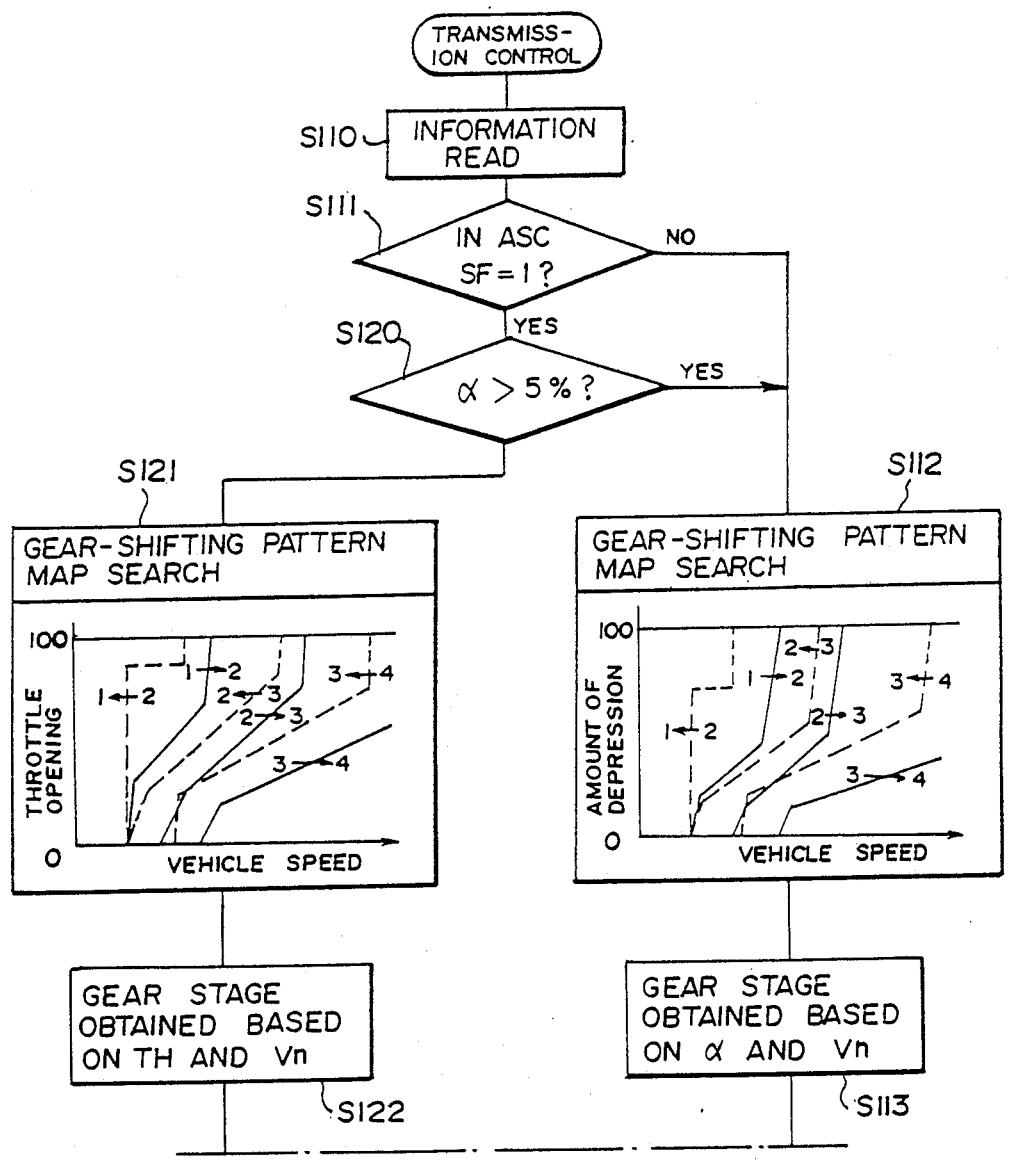
FIGS. 11, 11A and 11B are flow charts showing a modification of the transmission control routine of FIG. 5.
Figure 11B:
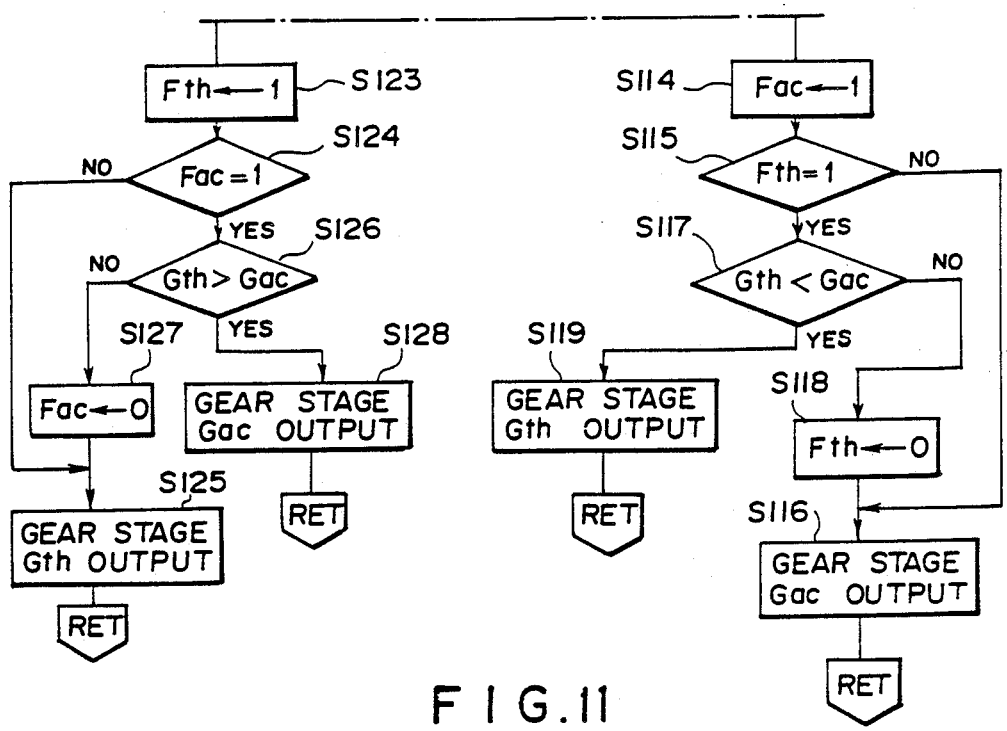
Figure 11:
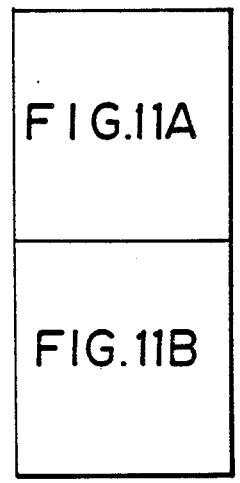

FIG. 11 shows a modification of the flow chart shown in FIG. 5. The transmission controller 8B first reads the actual vehicle speed Vn, the amount of depression α of the accelerator pedal, the throttle opening TH and the like in step S110. Then in step S111, the controller 8B determines whether the ASC is now operating. If the answer is NO, that is, if the control mode is the normal throttle control mode, the controller 8B obtains, on the basis of the detected amount of depression α of the accelerator and the actual vehicle speed Vn, a gear stage Gac from a normal throttle control mode gear-shifting pattern map in which the gear stages of the transmission are related to the vehicle speed Vn and the amount of depression α of the accelerator pedal (steps S112 and S113). Then the controller 8B sets a normal throttle control mode gear stage flag Fac to 1 in step S114. The normal throttle control mode gear stage flag Fac represents, when it is in the 1 position, that the gear stage has been set according to the amount of depression α of the accelerator pedal 10 and the vehicle speed Vn. In step S115, the controller 8B determines whether an ASC mode gear stage flag Fth is in the 1 position (to be described later with reference to steps S121 and S122). The ASC mode gear stage flag Fth represents, when it is in the 1 position, that the gear stage Gth has been set according to the throttle opening TH and the vehicle speed Vn. When it is determined that the ASC mode gear stage flag Fth is not in the 1 position, the controller 8B outputs in step S116 a gear-stage signal which represents the gear stage Gac obtained in steps S112 and S113. On the other hand, when it is determined in step S115 that the ASC mode gear stage flag Fth is in the 1 position, the controller 8B determines in step S117 whether the gear stage Gac is higher than the gear stage Gth. When it is determined that the gear stage Gac is higher than the gear stage Gth, the controller 8B outputs the gear stage Gac after resetting the ASC mode gear stage flag Fth to 0 (steps S118 and S116). When it is determined in step S117 that the gear stage Gac is not higher than the Gth, the controller 8B outputs the gear stage Gth in step S119. Because of steps S117, S118, S116 and S119, the controller 8B can prevent the automatic transmission from upshifting to fourth gear due to a change in the gear-shifting pattern when the accelerator pedal is depressed while the vehicle is cruising in third gear.

When it is determined in step S111 that the ASC is now operating and at the same time it is determined in step S120 that the accelerator pedal 10 has not been depressed, the controller 8B obtains, on the basis of the detected throttle opening TH and the actual vehicle speed Vn, a gear stage from an ASC mode gear-shifting pattern map in which the gear stages of the transmission are related to the vehicle speed Vn and the throttle opening (steps S121 and S122). Then the controller 8B sets the ASC mode gear stage flag Fth to 1 in step S123. In step S124, the controller 8B determines whether the normal throttle control mode gear stage flag Fac is in the 1 position. When it is determined that the normal throttle control mode gear stage flag Fac is not in the 1 position, the controller 8B outputs in step S125 a gear-stage signal which represents the gear stage Gth obtained in steps S121 and S122. On the other hand, when it is determined in step S124 that the normal throttle control mode gear stage flag Fac is in the 1 position, the controller 8B determines in step S126 whether the gear stage Gth is higher than the gear stage Gac. When it is determined that the gear stage Gth is higher than the gear stage Gac, the controller 8B outputs the gear stage Gth after resetting the normal throttle control mode gear stage flag Fac to 0 (steps S127 and S125). When it is determined in step S126 that the gear stage Gth is not higher than the Gac, the controller 8B outputs the gear stage Gac in step S128. Because of steps S126, S127, S125 and S128, the controller 8B can prevent the automatic transmission from upshifting to fourth gear due to a change in the gear-shifting pattern when the ASC is started while the vehicle is running in third gear in the normal throttle control mode.

Figure 13:
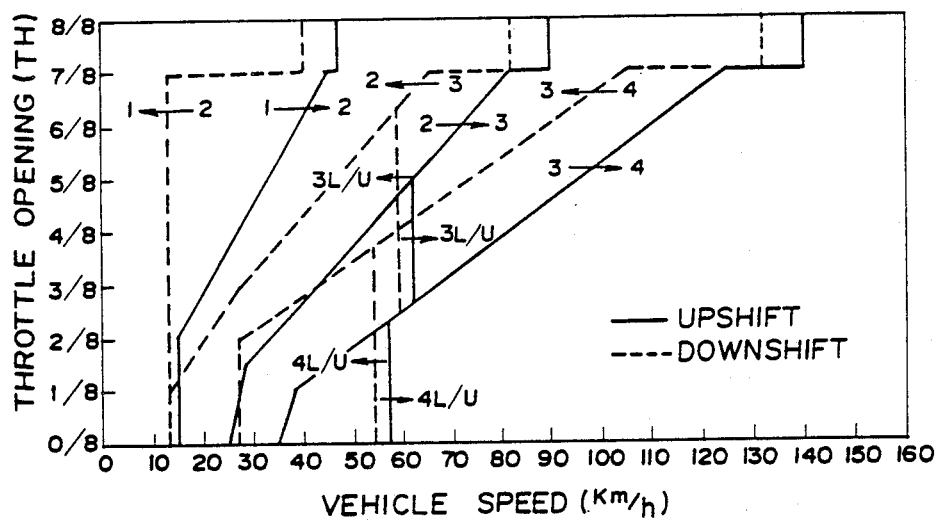
FIG. 13 shows, for the ASC mode, a gear-shifting pattern map in which the gear stages of the transmission are related to the vehicle speed and the throttle opening.
Figure 14:
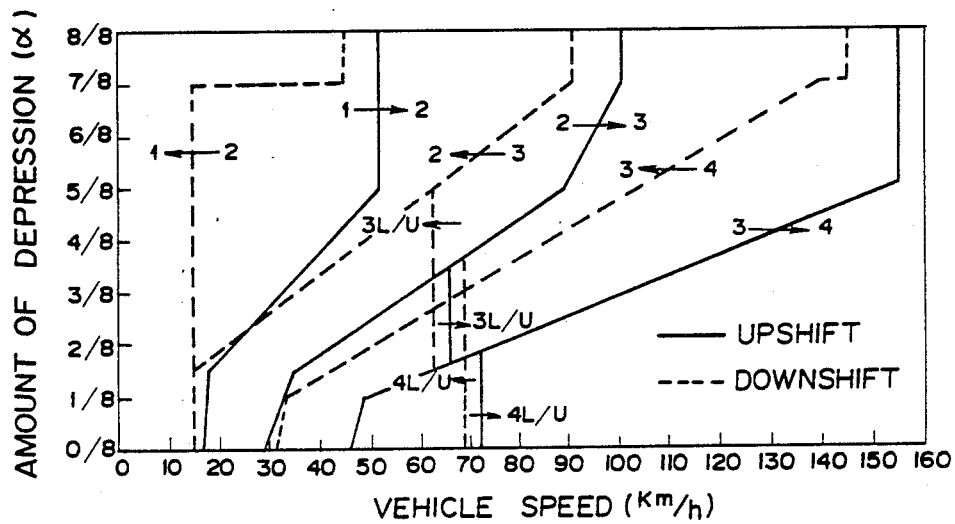
FIG. 14 shows, for the normal throttle control mode, a gear-shifting pattern map in which the gear stages of the transmission are related to the vehicle speed Vn and the amount of depression of accelerator pedal.

FIG. 13 shows an example of the ASC mode gear-shifting pattern map used in step S45 or S121 and in which the gear stages of the transmission are related to the vehicle speed and the throttle opening. FIG. 14 shows an example of the normal throttle control mode gear-shifting pattern map which is used in the step S43 or S112 and in which the gear stages of the transmission are related to the vehicle speed Vn and the amount of depression α of the accelerator pedal.

Figure 12:
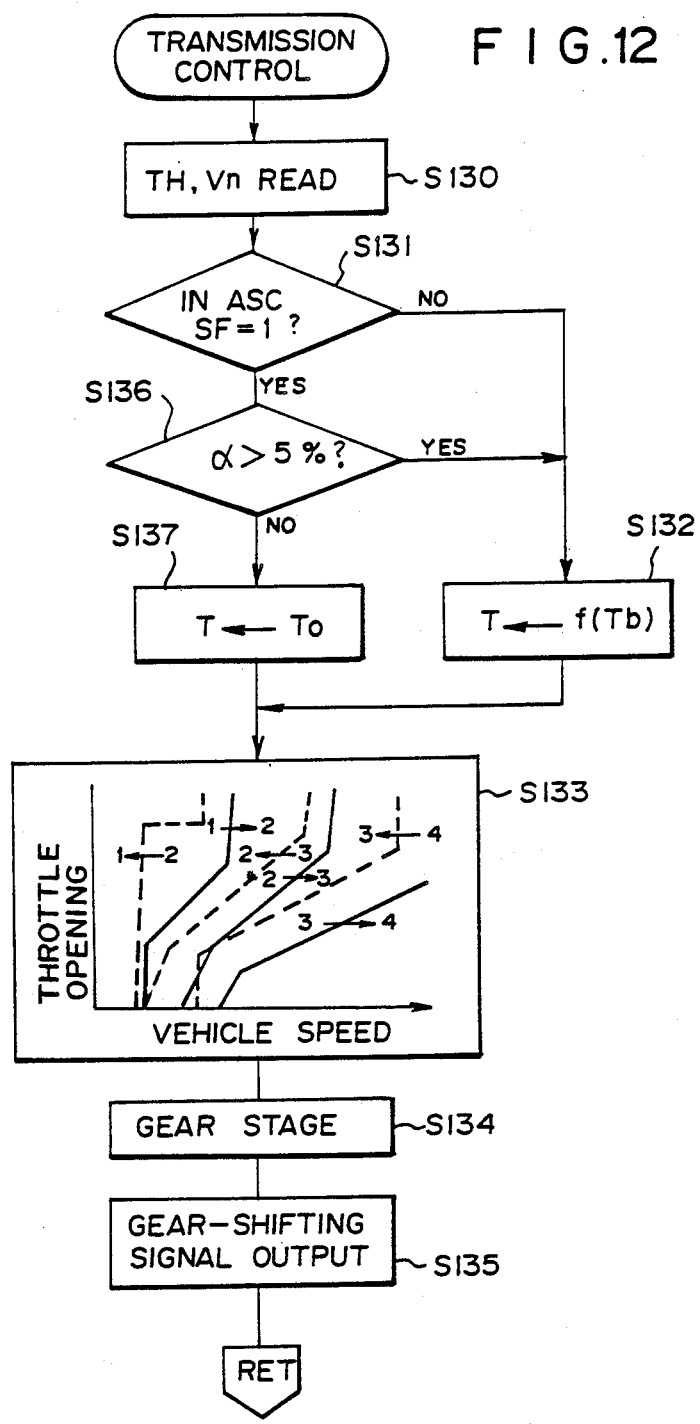
FIG. 12 is a flow chart showing another modification of the transmission control routine of FIG. 5.

FIG. 12 shows another modification of the flow chart shown in FIG. 5. The transmission controller 8B first reads the actual vehicle speed Vn, and the throttle opening TH in step S130. Then in step S131, the controller 8B determines whether the ASC is now operating. If the answer is NO, that is, if the control mode is the normal throttle control mode, the controller 8B converts the amount of depression α of the accelerator pedal to a throttle opening on the basis of the function for obtaining the basic throttle opening Tb for a given amount of depression of the accelerator pedal. The controller 8B then obtains a gear stage on the basis of the throttle opening T (obtained from knowing Tb) and the vehicle speed Vn from a gear-shifting pattern map in which the gear stages of the transmission are related to the vehicle speed Vn and the throttle opening Tb, and outputs a gear-shifting signal which commands the transmission to enter the gear stage obtained from the map (steps S132 to S135). On the other hand, when it is determined in the step S131 that the ASC is now operating, and when it is determined in step S136 that the accelerator pedal has not been depressed, the controller 8B adopts the target throttle opening To used in the ASC as the throttle opening T (step S137), obtains a gear stage on the basis of the throttle opening T and the vehicle speed Vn from the same gear-shifting pattern map, and outputs a gear-shifting signal which commands the transmission to enter the gear stage obtained from the map (steps S133 to S135).

Though, in the embodiments described above, the throttle controller 8A and the transmission controller 8A are separated from each other, they may be integral with each other.

We claim:

1. An automatic transmission control system for controlling an automatic transmission for use in a vehicle provided with an electronic throttle control system which electrically controls a throttle valve to control the engine output according to the amount of depression of an accelerator pedal and a constant speed cruising control system which controls the throttle valve separately from the accelerator pedal to make the vehicle cruise at a desired constant speed, the accelerator pedal being operatively separated from the throttle valve during operation of the constant speed cruising control system, characterized by having
   a first gear-stage setting means which designates a gear stage of the automatic transmission on the basis of a first gear-shifting pattern, which applies when the constant-speed cruising control is not performed, and in which the gear stages of the automatic transmission are selected in response to the detected amount of depression of the accelerator pedal and a vehicle speed or a value corresponding to the vehicle speed, a second gear-stage setting means which designates a gear stage of the automatic transmission on the basis of a second gear-shifting pattern, which applies when the constant-speed cruising control is performed in which the gear stages of the automatic transmission are selected in response to the vehicle speed or a value coresponding to the vehicle speed, and a variable independent of the detected amount of depression of the accelerator pedal.

2. An automatic transmission control system as defined in claim 1 in which said variable is a value which depends upon a throttle opening.

3. An automatic transmission control system as defined in claim 2 in which said first gear-stage setting means causes the automatic transmission to upshift from a second highest gear stage to a highest gear stage at a speed higher than the speed at which the second gear-stage setting means causes the automatic transmission to upshift from the second highest gear stage to the highest gear stage.

4. An automatic transmission control system as defined in claim 2 in which said first gear-stage setting means causes the automatic transmission to downshift from a highest gear stage to a second highest gear stage at a speed higher than the speed at which the second gear-stage setting means causes the automatic transmission to downshift from the highest gear stage to the second highest gear stage.

5. An automatic transmission control system as defined in claim 4 in which said first gear-stage setting means causes the automatic transmission to upshift from the second highest gear stage to the highest gear stage at a speed higher than the speed at which the second gear-stage setting means causes the automatic transmission to upshift from the second highest gear stage to the highest gear stage.

6. An automatic transmission control system as defined in claim 2 in which said constant-speed cruising control system controls the throttle opening to a value corresponding to the amount of depression of the accelerator pedal when the amount of depression of the accelerator pedal exceeds a preset value and at this time said automatic transmission operates under the control of said first gear-stage setting means.

7. An automatic transmission control system as defined in claim 6 in which when control is switched from said second gear-stage setting means to the first gear-stage setting means, the automatic transmission is prevented from upshifting.

8. An automatic transmission control system as defined in claim 2 in which when control is switched from said second gear-stage setting means to the first gear-stage setting means, the automatic transmission is prevented from upshifting.

9. An automatic transmission control system as defined in claim 2 in which when control is switched from said first gear-stage setting means to the second gear-stage setting means, the automatic transmission is prevented from upshifting.

10. An automatic transmission control system as defined in claim 9 in which when control is switched from said second gear-stage setting means to the first gear-stage setting means, the automatic transmission is prevented from upshifting.

11. An automatic transmission control system as defined in claim 2 in which said detected amount of depression of the accelerator pedal is a value derived from an actual throttle opening on the basis of a predetermined relationship between the amount of depression of the accelerator pedal and the throttle opening.

12. An automatic transmission control system as defined in claim 1 in which said second gear-stage setting means allows the automatic transmission to shift-up and shift-down to another gear-stage from a gear-stage initially selected during a constant-speed cruising control.

13. An automatic transmission control system as defined in claim 1 in which said vehicle speed or a value corresponding to the vehicle speed is independent of said desired constant speed.

* * * * *